3,225,076
PROCESS FOR PREPARING DERIVATIVES
OF STANNOGLUCONIC ACID
Leonard M. Edwards, Cranford, N.J., assignor, by mesne assignments, to M & T Chemicals Inc., New York, N.Y., a corporation of Delaware
No Drawing. Filed Oct. 2, 1962, Ser. No. 227,938
15 Claims. (Cl. 260—429.7)

This invention relates to a novel dentifrice composition. More particularly, it relates to a dentifrice containing a novel composition of matter.

In accordance with certain aspects of this invention, salts of stannogluconic acid characterized by their freedom from objectionable color, taste, and odor may be prepared by the process which comprises mixing an aqueous solution of an acid selected from the group consisting of gluconic acid and gluconolactone with stannous hydroxide thereby forming an aqueous solution of stannogluconic acid; treating said aqueous solution with activated carbon; and neutralizing said stannogluconic acid with a base thereby forming an aqueous solution of a salt of said stannogluconic acid.

The stannous hydroxide which may be employed in practice of this invention may be active stannous hydroxide, typically prepared by reaction in aqueous medium of a soluble stannous compound, typically stannous chloride, with a base, typically ammonium hydroxide, according to the reaction:

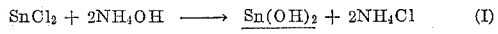

$$SnCl_2 + 2NH_4OH \longrightarrow \underline{Sn(OH)_2} + 2NH_4Cl \qquad (I)$$

The product stannous hydroxide precipitate may be separated by filtration or decantation and washed with water, preferably distilled water, until it is free of by-products, including chloride ion. The so-prepared precipitated stannous hydroxide may then be slurried in water and stored for use. Preferably the stannous hydroxide will be active, e.g., freshly prepared immediately before or at least shortly prior to its use in the reaction with gluconic acid.

The acid which may be employed in practice of this invention may be gluconic acid or gluconolactone. When the latter compound is used, it may be converted to gluconic acid on dissolution in aqueous solvent and thus it may react in substantially the same manner as gluconic acid, se. The gluconolactone employed may typically be glucono-γ-lactone or glucono-δ-lactone. These compounds may typically be employed as commercial compounds.

The acid reactant, gluconic acid or gluconolactone, may be reacted with the stannous hydroxide by adding one mole of the latter to 1.5–2.5, say 2 moles of the former, preferably in aqueous solution. The gluconolactone will preferably be present in amount sufficient to yield a concentration of about 5%–35%, say 30% of product stannogluconic acid in the aqueous solution. Preferably 450–4500, say 600 parts of water may be used per mole of gluconic acid or gluconolactone.

The reaction of the acid reactant and the stannous hydroxide may be preferably carried out at relatively low temperatures and preferably from about 20° C. to about 50° C. Moderate agitation may be employed. Under these conditions, the stannous hydroxide in the slurry may begin to dissolve almost immediately and may dissolve completely within about 1–3 hours.

It has been unexpectedly found that the product stannogluconic acid prepared according to the above-described "neutralization" process appears to contain substantially the same number of unreacted or free carboxyl groups as does gluconic acid. This is surprising because the expected reaction product is the stannous gluconate salt wherein the tin atom is bonded to the acid through the carboxylate group of the gluconic acid. It is a further unexpected feature of the solutions of the novel product that they may have a very low pH, typically 1.9 when prepared as herein noted. It was expected that the pH would be close to 7 at the completion of the "neutralization." The novel product, when reacted with a base, typically ammonium hydroxide, does not precipitate stannous hydroxide as would a conventional stannous salt or soap, thus indicating that the stannous ion may be bound to the molecule through some unexpected mechanism. This novel composition may be named stannogluconic acid.

Preparation of salts of the stannogluconic acid may be effected by reacting stannogluconic acid with a base. Preferably one equivalent of the former may be reacted with one equivalent of the latter. Typical bases which may be employed include those containing as anions, hydroxides, carbonates, bicarbonates, etc. of metal cations which may include ammonium, alkali metals such as sodium, potassium, lithium, etc. alkaline earth metals such as barium, calcium, strontium, etc. or various other metals. Obviously when the cationic portion of the base is polyvalent, more than one of the stannogluconic acid residues may be bonded thereto.

Preferably, the base typically ammonium hydroxide, may be added to the aqueous solution of the stannogluconic acid. The acid and the base may react substantially immediately to form the desired salt. It has been observed that the product salts, typically the ammonium stannogluconate, may unexpectedly possess undesirable odor and commonly undesirable taste or color which render it unsatisfactory for desired dental use. It is not possible to remove these undesirable properties from the salts by treating their aqueous solutions with decolorizing agents or clarifying agents. Furthermore, it is found that these properties, particularly the undesirable odor, may be present even when the product is prepared from raw materials, e.g., gluconic acid, active stannous hydroxide, and ammonium hydroxide, which appear to be substantially pure. Repeated and extended attempts to clarify the stannogluconate salts have been unsuccessful.

It is a particular feature of the instant invention, according to certain of its aspects, that it may be possible to prepare salts of stannogluconic acid characterized by their freedom from objectionable color, odor, and taste by the process which comprises mixing in aqueous solution stannous hydroxide and an acid selected from the group consisting of gluconic acid and gluconolactone thereby forming an aqueous solution of stannogluconic acid, treating said aqueous solution with activated carbon, and reacting said stannogluconic acid with a base.

In accordance with this invention, production of the novel salts may be effected by treating the stannogluconic acid, preferably in aqueous solution and prior to addition of base, with a purifying amount of activated carbon. Typically, this may be accomplished by adding to 100 parts by weight of 5%–35%, say 30% stannogluconic acid solution, 0.2 to 4.0, say 0.5 part by weight of activated carbon. The mixture of carbon and acid solution, typically at temperature of 15° C.–60° C., say 20° C. may be agitated or stirred for 10–150, say 60 minutes. The carbon may then be removed from the solution as by filtration. The so-clarified solution may be water-white in color and substantially free of odor and taste.

A series of experiments may be conducted wherein gluconic acid may be reacted with active stannous hydroxide to form stannogluconic acid and the acid neutralized with ammonium hydroxide. In these experiments, the raw materials—gluconic acid, stannous chloride, and ammonium hydroxide, were of commercial purity. In the first experiment, the stannogluconic acid may be treated with 0.5% by weight of activated carbon before being reacted with the ammonium hydroxide. In the second experiment, the solution of ammonium stannogluconate may be treated with 0.5% by weight of activated carbon.

In the first experiment, it may be unexpectedly found that the stannogluconic acid and the ammonium stannogluconate produced therefrom are substantially completely free of any undesirable odor, color, and taste. In the second experiment, it may be found that no matter how much or how many times the salt is treated with activated carbon, the product retains its characteristic undesirable odor, color, and taste.

The following examples illustrate production of the novel acid and salts according to practice of this invention, all parts being parts by weight.

*Example I*

In this example, which illustrates the production of stannogluconic acid, 70.0 parts of stannous chloride were dissolved in about 200 parts of water and 44.5 parts of C.P. ammonium hydroxide were added. The resulting precipitate of active stannous hydroxide, after settling, was filtered and washed with deionized water until the filtrate was free of chloride ion as determined by testing with silver nitrate. The washed stannous hydroxide was transferred to a reaction vessel. 131.0 parts of glucono-δ-lactone dissolved in 400 parts of deionized water (this solution having a pH of 1.9), were added to the reaction vessel with stirring. The mixture was agitated for about 2 hours at room temperature, within which time all of the solid stannous hydroxide was dissolved. The pH of this solution was determined and was found to be 1.9, the same as that of the unreacted gluconolactone. Apparently, substantially all the carboxyl groups remained unreacted at the completion of the reaction. Analysis of the product showed that it contained one mole of stannous ion and two moles of gluconate ion. This solution had a yellow-brown color, a foul, musty odor, and an offensive, musty taste.

*Example II*

This example illustrates production of salts of stannogluconic acid.

Two aliquot solutions of stannogluconic acid were prepared according to the procedure of Example I. The first of these aliquot solutions was treated with about 2 grams of the activated carbon sold under the trademark Nuchar WA. The carbon was thoroughly dispersed and the mixture was agitated for about one hour, after which the carbon was allowed to settle. The solution was filtered through the diatomaceous earth sold under the trademark Decalite. The resulting solution was clear, sparkling and colorless, and had no undesirable odor or taste. A slight acid taste was noted, which was due to the low pH (1.9) of the solution. Portions of the solution were neutralized to pH 7 with ammonium hydroxide and sodium hydroxide to form in solution, respectively, ammonium stannogluconate and sodium stannogluconate. These products were also found to be clear, sparkling and colorless, with no appreciable undesirable odor or taste.

The second of the aliquot solutions of stannogluconic acid was neutralized with ammonium hydroxide to a pH 7. The yellow-brown color, musty odor and foul, musty taste were somewhat intensified. This solution was also subjected to the same activated carbon treatment as noted supra. After such treament, it was found that the undesirable color, taste and odor were not appreciably improved. The solution was given two more identical carbon treatments but the objectionable color, odor and taste were not satisfactorily improved.

From an inspection of the above, it may readily be seen that practice of this invention permits attainment of highly desirable results. Specifically, it permits production of novel salts of stannogluconic acid which are characterized by their freedom from undesirable color, taste, and odor and which are particularly suitable for use in dentifrice compositions. The ammonium gluconate-stannous tin complex not prepared in accordance with this invention could not be freed from its undesirable impurities and may, therefore, be completely unsatisfactory for dental use.

Although it may be desirable to use either the stannogluconic acid of Example I, or salts thereof including the ammonium salt as prepared by the process of Example II, in the form of solutions, it is preferred to recover these materials in solid form. This may be effected by cooling the solution, typically having a concentration of 25%–35% by weight to a temperature of 0° C.–5° C. Under these conditions, it may be possible to recover white crystalline precipitates of either the stannogluconic acid or the salt, e.g., ammonium stannogluconate; and either of these may be isolated for example by filtration followed by appropriate washing and drying.

It is a particular feature of this invention that the novel highly purified stannogluconic acid or stannogluconate may be employed in dentifrice compositions. Use of either of these materials permits attainment of a dentifrice composition which contains desired concentration of tin in form which may be readily usable. Either the acid or its soluble salts, typically the ammonium or alkali metal salts, may be readily blended with various dentifrice compositions, either in dry form or wet form. Although stannogluconic acid may be employed, it is highly preferred to employ the salts thereof, preferably sodium stannogluconate. Because of its higher solubility in water and because it may desirably permit formation of a dentifrice having a higher pH, the ammonium salt may be used. It has been found that a higher pH dentifrice, i.e., higher than that obtained by use of the acid alone, may be more desirable in that it maximizes any foaming action. It is preferred to prepare a dentifrice, typically a toothpaste, which has a pH value in the range of about 3.5 to 6, preferably 4 to 5.5. Use of the salt readily permits preparation of dentifrices having this pH. The salts of stannogluconic acid may also be more resistant than the stannogluconic acid, se to degradation, including oxidative or bacterial degradation.

According to certain aspects of this invention, a novel dentifrice composition may comprise a dentifrice base and as active ingredient the novel products of this invention.

The dentifrice composition may be a dentifrice paste composition, and the dentifrice base may be a dentifrice paste base. A typical dentifrice paste base may comprise 25–55% by weight abrasive, typically calcium pyrophosphate; 1–5% by weight sudsing agent, typically sodium lauryl sulfate; 1–5% by weight thickening agent, typically sodium carboxymethyl cellulose; 5–35% by weight humectant; flavoring, typically oil of spearmint, to taste; and the balance water. The dentifrice paste composition may be produced by combining 100 parts by weight of dentifrice paste base with about 0.1–5, say 1 part by weight of a salt of stannogluconic acid, e.g., sodium stannogluconate, prepared according to the process of this invention.

The dentifrice composition may be a dentifrice powder composition, and the dentifrice base may be a dentifrice powder base. A typical dentifrice powder base may comprise 65–95% by weight abrasive, typically calcium pyrophosphate; 1–5% by weight of sudsing agent, typically sodium lauryl sulfate; and flavoring, typically oil of spearmint, to taste. The dentifrice powder composition may typically be produced by combining 100 parts by weight of dentifrice powder base with about 0.1–5, say 0.5 part by weight of a salt of stannogluconic acid, e.g., sodium stannogluconate, prepared in accordance with this invention.

A typical dentifrice composition containing sodium stannogluconate may comprise the following, wherein all parts are parts by weight.

| Ingredient: | Parts |
|---|---|
| Sodium stannogluconate (as 33% solution in water) | 3.0 |
| Calcium pyrophosphate | 38.50 |
| Sodium carboxymethyl cellulose | 1.5 |
| Magnesium aluminum silicate | 0.50 |
| Sorbitol | 22.0 |
| Glycerine | 9.0 |
| Sodium lauryl sulfate | 1.50 |
| Saccharin | 0.1 |
| Flavor | 0.7 |
| Water | 26.2 |

Teeth which have been contacted with such dentifrice composition may be found to be unexpectedly resistant to etching by dilute acids.

Other salts of stannogluconic acid or stannogluconic acid, se, may similarly be employed in dentifrice compositions.

These novel dentifrice compositions, whether in paste form or in powder form, contain desirable quantities of tin which may be occluded on the surface of teeth and thereby assist in the formation of proper tooth structure.

It is a particular feature of this invention that it may permit production of relatively concentrated solutions of stannogluconic acid and salts thereof which are free of undesirable color, taste and odor, and which are especially suitable for use in dentifrice compositions.

A typical such novel composition which may be prepared may be the 20–35% by weight aqueous solution of stannogluconic acid characterized by its freedom from objectionable color, odor, and taste, having a stannous tin content of 5–8% by weight, a pH of about 1.5–3.0, a specific gravity of about 1.1–1.2, and a stannous tin:gluconate ratio of about 1:1.5–2.5.

A preferred such novel composition which may most suitably be prepared by the process of this invention may be the 27–29% by weight aqueous solution of stannogluconic acid characterized by its freedom from objectionable color, odor and taste, having a stannous tin content of 6.3–6.7% by weight, a pH of about 1.8–2.3, a specific gravity of 1.165–1.175, and a stannous tin:gluconate ratio of about 1:2.

Although this invention has been illustrated by reference to specific examples, changes therein which clearly fall within the scope of the invention will be apparent to those skilled in the art.

I claim:

1. The process for preparing salts of stannogluconic acid characterized by their freedom from objectionable color, taste, and odor which comprises mixing an aqueous solution of an acid selected from the group consisting of gluconic acid and gluconolactone with stannous hydroxide thereby forming an aqueous solution of stannogluconic acid, treating said aqueous solution of stannogluconic acid with activated carbon before neutralizing said stannogluconic acid and neutralizing said stannogluconic acid with a base thereby forming an aqueous solution of a salt of said stannogluconic acid characterized by freedom from objectionable color, taste, and odor.

2. The process for preparing salts of stannogluconic acid as claimed in claim 1 wherein the acid and the stannous hydroxide are mixed at 20–50° C.

3. The process for preparing salts of stannogluconic acid as claimed in claim 1 wherein the stannous hydroxide is freshly prepared stannous hydroxide.

4. The process for preparing salts of stannogluconic acid as claimed in claim 1 wherein the acid is gluconic acid.

5. The process for preparing salts of stannogluconic acid as claimed in claim 1 wherein the acid is glucono-δ-lactone.

6. The process for preparing salts of stannogluconic acid as claimed in claim 1 wherein the base is selected from the group consisting of ammonium, alkali metal, and alkaline earth metal hydroxides, carbonates, and bicarbonates.

7. The process for preparing salts of stannogluconic acid characterized by their freedom from objectionable color, taste, and odor which comprises mixing an aqueous solution of an acid selected from the group consisting of gluconic acid and gluconolactone with stannous hydroxide in the ratio of one mole of hydroxide to 1.5–2.5 moles of acid, thereby forming an aqueous solution of stannogluconic acid; treating said aqueous solution of stannogluconic acid with activated carbon before neutralizing said stannogluconic acid; and neutralizing said stannogluconic acid with a base thereby forming an aqueous solution of a salt of said stannogluconic acid characterized by freedom from objectionable color, taste, and odor.

8. The process for preparing salts of stannogluconic acid as claimed in claim 7 wherein the stannous hydroxide is freshly prepared stannous hydroxide.

9. The process for preparing salts of stannogluconic acid as claimed in claim 7 wherein the acid is gluconic acid.

10. The process for preparing salts of stannogluconic acid as claimed in claim 7 wherein the acid is glucono-δ-lactone.

11. The process for preparing salts of stannogluconic acid as claimed in claim 7 wherein the base is selected from the group consisting of ammonium, alkali metal, and alkaline earth metal hydroxides, carbonates and bicarbonates.

12. The process for preparing stannogluconic acid characterized by its freedom from objectionable color, taste, and odor which comprises mixing an aqueous solution of an acid selected from the group consisting of gluconic acid and gluconolactone with stannous hydroxide in the ratio of one mole of hydroxide to 1.5–2.5 moles of acid thereby forming an aqueous solution of stannogluconic acid; and treating said aqueous solution of stannogluconic acid with activated carbon.

13. The process for preparing stannogluconic acid as claimed in claim 12 wherein the stannous hydroxide is freshly prepared stannous hydroxide.

14. The process for preparing stannogluconic acid as claimed in claim 12 wherein the acid is gluconic acid.

15. The process for preparing stannogluconic acid as claimed in claim 12 wherein the acid is glucono-δ-lactone.

References Cited by the Examiner

UNITED STATES PATENTS

| 1,893,872 | 1/1933 | Schmidt et al. | 260—429.7 |
| 2,215,429 | 9/1940 | Schmidt et al. | 260—429 |
| 2,744,938 | 5/1956 | Urban | 260—708 |
| 3,034,967 | 5/1962 | Apperson et al. | 167—93 |
| 3,070,510 | 12/1962 | Cooley et al. | 167—93 |
| 3,098,088 | 7/1963 | Polster | 260—429.7 |
| 3,099,668 | 7/1963 | Zweigle et al. | 260—429.7 |
| 3,105,798 | 10/1963 | Holiday | 167—93 |

TOBIAS E. LEVOW, *Primary Examiner.*

FRANK CACCIAPAGLIA, JR., *Examiner.*